(12) United States Patent
Imatoh

(10) Patent No.: US 11,587,211 B2
(45) Date of Patent: Feb. 21, 2023

(54) IMAGE DISTORTION CORRECTION CIRCUIT AND DISPLAY DEVICE

(71) Applicant: LAPIS Semiconductor Co., Ltd., Yokohama (JP)

(72) Inventor: Yuki Imatoh, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 17/217,246

(22) Filed: Mar. 30, 2021

(65) Prior Publication Data

US 2021/0304372 A1 Sep. 30, 2021

(30) Foreign Application Priority Data

Mar. 31, 2020 (JP) .............................. JP2020-062224

(51) Int. Cl.
*G06T 5/00* (2006.01)
*G06T 7/00* (2017.01)
(Continued)

(52) U.S. Cl.
CPC ................ *G06T 5/006* (2013.01); *G06T 5/50* (2013.01); *G06T 7/0002* (2013.01); *G09G 5/37* (2013.01); *G06T 2207/30168* (2013.01); *G09G 2320/02* (2013.01); *G09G 2340/14* (2013.01); *G09G 2380/10* (2013.01)

(58) Field of Classification Search
CPC ......... G06T 5/006; G06T 5/50; G06T 7/0002; G06T 2207/30168; G09G 5/37; G09G 2320/02; G09G 2340/14; G09G 2380/10; G09G 5/00; G09G 2320/0693; G09G 2330/12; G09G 2370/10; G09G 5/003;
(Continued)

(56) References Cited

U.S. PATENT DOCUMENTS

2016/0364847 A1* 12/2016 Bouzaraa et al. ...... G06T 5/005
2019/0266711 A1* 8/2019 Anand et al. .......... H04N 5/142

FOREIGN PATENT DOCUMENTS

CN 109803117 A * 5/2019
JP 2012010125 A * 1/2012
(Continued)

*Primary Examiner* — Jeffery A Brier
(74) *Attorney, Agent, or Firm* — Rabin & Berdo, P.C.

(57) ABSTRACT

An image distortion correction circuit according to the present invention comprises; a first distortion correction circuit that performs a mapping process on an input image signal to generate a distortion-corrected image signal; an inspection region defining circuit that defines an inspection image region in the one-frame image; an inspection region extraction circuit that extracts a part corresponding to the inspection image region from the distortion-corrected image signal and outputs the part of the distortion-corrected image signal as a first inspection image signal; a second distortion correction circuit that outputs a second inspection signal, the second inspection signal being generated by performing the mapping process on the part of the input image signal corresponding to the inspection image region; and a failure determination circuit that determines that a failure occurs and outputs a failure detection signal when the first inspection image signal and the second inspection image signal are mutually different.

4 Claims, 4 Drawing Sheets

(51) Int. Cl.
  *G06T 5/50* (2006.01)
  *G09G 5/37* (2006.01)
(58) Field of Classification Search
  CPC ................ G09G 3/001; G02B 27/0101; G02B 2027/011; G02B 2027/014
  See application file for complete search history.

(56) References Cited

FOREIGN PATENT DOCUMENTS

| | | | |
|---|---|---|---|
| JP | 2019149760 A | | 9/2019 |
| KR | 101713244 B1 | * | 3/2017 |

* cited by examiner

IMAGE DISTORTION CORRECTION CIRCUIT AND DISPLAY DEVICE

BACKGROUND

1. Technical Field

The present invention relates to an image distortion correction circuit that corrects distortion of an image and a display device including this image distortion correction circuit.

2. Description of the Related Art

As a display mounted to a vehicle, such as an automobile, a head-up display (also referred to as a HUD) that projects various kinds of driving support information, such as navigation information and a vehicle state, to a windshield has been recently productized.

The windshield of the vehicle serving as a projection screen is generally inclined and has a non-planar surface. Therefore, to provide a driver with an image without distortion when an image is projected to the windshield, the HUD device performs image distortion correction that corrects distortion of the projection image generated due to the inclination and the non-planar shape of the windshield on an image signal representing the driving support information.

An image processing circuit performing a mapping process that moves a coordinate position of each pixel in an image based on an image signal corresponding to a shape and an inclination of a windshield of a vehicle has been recently proposed as image distortion correction (for example, see JP-A-2019-149760).

However, a failure in the mapping process by the image processing circuit fails to visually confirm the information required for driving, such as the driving support information, or causes an obstacle, such as obstruction of eyesight ahead of a windshield.

Therefore, this image processing circuit further includes a circuit that performs a mapping process similar to the above-described circuit that performs the mapping process. Whether respective outputs from these mapping processing circuits, that is, image signals on which distortion corrections have been performed are matched is compared. Then, when the comparison result is a mismatch, the image processing circuit determines that a failure occurs in the mapping processing circuit and notifies a user of the fact.

SUMMARY

The distortion correction by the above-described mapping process requires a comparatively large-capacity memory. Accordingly, the image processing circuit that needs to include the two-system mapping processing circuits for failure detection had problems of increases in circuit scale and power consumption.

An object of the present invention is to provide an image distortion correction circuit and a display device that allow failure detection without causing increases in circuit scale or power consumption.

An image distortion correction circuit according to the present invention includes a first distortion correction circuit, an inspection region defining circuit, an inspection region extraction circuit, a second distortion correction circuit, and a failure determination circuit. The first distortion correction circuit performs a mapping process on an input image signal to generate a distortion-corrected image signal. In the mapping process a distortion occurred in a one-frame image represented by the input image signal are corrected. The inspection region defining circuit defines an inspection image region in the one-frame image for failure inspection, the inspection image region having a smaller size than the one-frame image. The inspection region extraction circuit extracts a part corresponding to the inspection image region from the distortion-corrected image signal and outputs the part of the distortion-corrected image signal as a first inspection image signal. The second distortion correction circuit outputs a second inspection signal, the second inspection signal being generated by performing the mapping process on the part of the input image signal corresponding to the inspection image region. The failure determination circuit determines that a failure occurs and outputs a failure detection signal when the first inspection image signal and the second inspection image signal are mutually different.

A display device according to the present invention includes a first distortion correction circuit, an image irradiation unit, an inspection region defining circuit, an inspection region extraction circuit, a second distortion correction circuit, and a failure determination circuit. The first distortion correction circuit performs a mapping process on an input image signal to generate a distortion-corrected image signal. In the mapping process a distortion occurred in a one-frame image represented by the input image signal are corrected. The image irradiation unit irradiates a display light to project an image indicated by the distortion-corrected image signal. The inspection region defining circuit defines an inspection image region in the one-frame image for failure inspection, the inspection image region having a smaller size than the one-frame image inspection region defining circuit The inspection region extraction circuit extracts a part corresponding to the inspection image region from the distortion-corrected image signal and outputs the part of the distortion-corrected image signal as a first inspection image signal. The second distortion correction circuit outputs a second inspection signal, the second inspection signal being generated by performing the mapping process on the part of the input image signal corresponding to the inspection image region. The failure determination circuit determines that a failure occurs and outputs a failure detection signal when the first inspection image signal and the second inspection image signal are mutually different.

In the present invention, the distortion correction circuit additionally disposed for failure inspection performs the mapping process only on the part corresponding to the inspection image region having the smaller size than the one-frame image in the image signal by one frame. This allows decrease in circuit scale and amount of power consumption compared with a case of employing a distortion correction circuit additionally disposed for failure inspection that performs a mapping process on an image signal by one frame.

DETAILED DESCRIPTION

Figure 1:
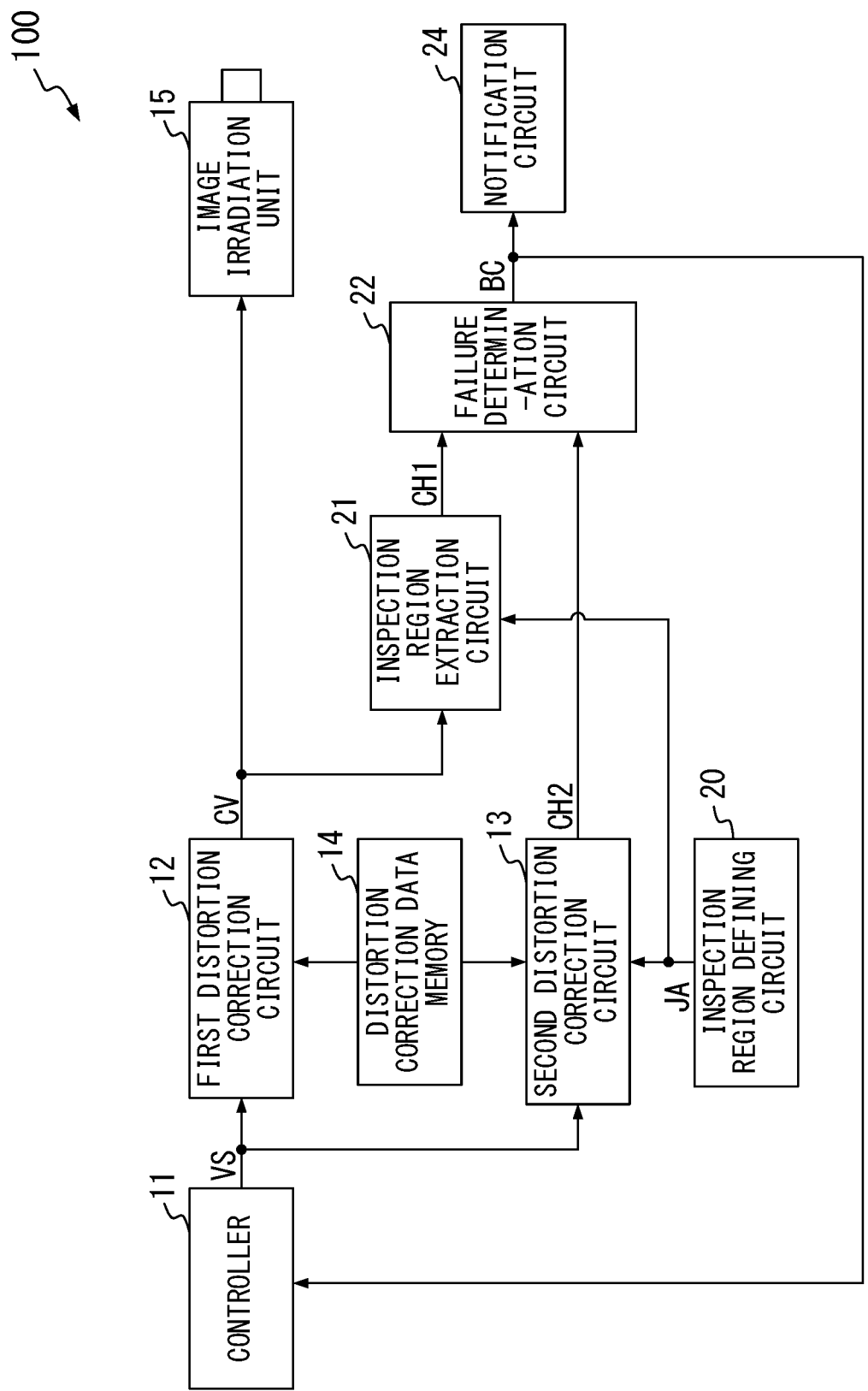
FIG. 1 is a block diagram illustrating a configuration of a head-up display device 100 as a display device including an image distortion correction circuit according to the present invention.

FIG. 1 is a block diagram illustrating a configuration of a head-up display (HUD) device 100 as a display device including an image distortion correction circuit according to the present invention.

As illustrated in FIG. 1, the HUD device 100 includes a controller 11, a first distortion correction circuit 12, a second distortion correction circuit 13, a distortion correction data memory 14, an image irradiation unit 15, an inspection region defining circuit 20, an inspection region extraction circuit 21, a failure determination circuit 22, and a notification circuit 24.

The controller 11 generates an image signal representing a behavior of a vehicle, an instantaneous fuel consumption, a state of a battery, a traveling speed, and driving support information to assist driving by a driver with a character, a drawing, and the like.

When the controller 11 receives a failure detection signal BC indicative of a failure in the above-described first distortion correction circuit 12, second distortion correction circuit 13, or distortion correction data memory 14, the controller 11 generates an image signal representing an image of notifying the failure. When a failure occurs in the first distortion correction circuit 12, the second distortion correction circuit 13, or the distortion correction data memory 14, a projection image projected to the windshield of the vehicle possibly obstructs forward eyesight. Therefore, when the controller 11 receives this failure detection signal BC, an image signal with enhanced transparency of the character or the drawing as the driving support information may be generated.

The controller 11 supplies the first distortion correction circuit 12 and the second distortion correction circuit 13 with the image signal generated as described above as an input image signal VS.

The inspection region defining circuit 20 defines an image region having a smaller size than a one-frame image as an inspection image region Ca for failure inspection. The inspection region defining circuit 20 supplies the inspection image region Ca and an inspection image region designation signal JA indicative of a coordinate position of the inspection image region Ca in the one-frame image to the second distortion correction circuit 13 and the inspection region extraction circuit 21. The inspection region defining circuit 20 randomly changes the coordinate position of the inspection image region Ca for each frame. In this respect, the inspection region defining circuit 20 may change the coordinate position of this inspection image region Ca such that all regions in the one-frame image certainly become an inspection target with the inspection image region Ca in a display period of a predetermined number of frames.

Figure 2:
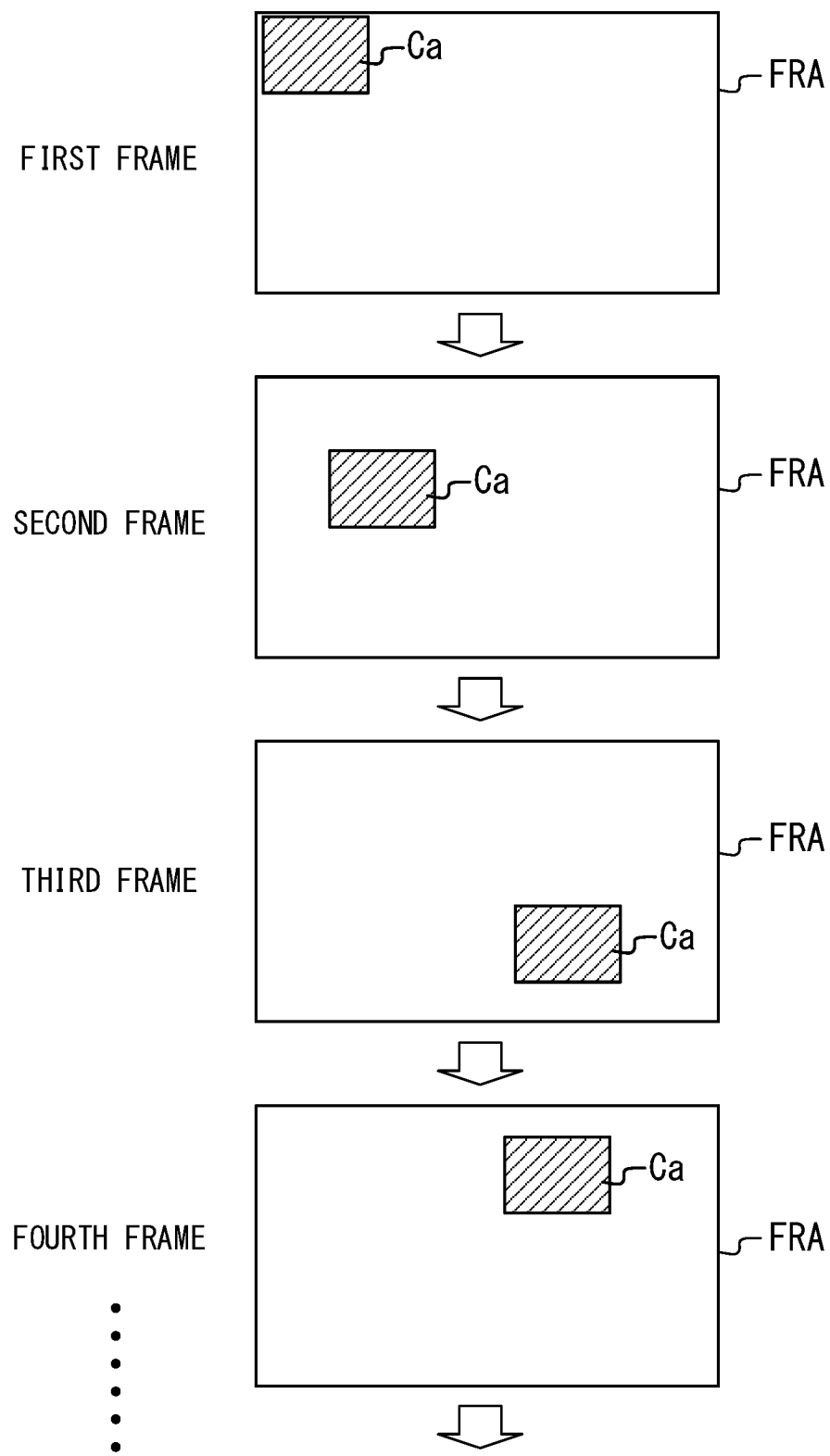
FIG. 2 is a drawing illustrating an example of an inspection image region Ca and an example of a moving configuration of the inspection image region Ca that changes a coordinate position in one-frame image FRA for each frame.

FIG. 2 is a drawing illustrating an example of the inspection image region Ca and an example of a moving configuration of the inspection image region Ca that changes the coordinate position in the one-frame image FRA for each frame.

Figure 3:
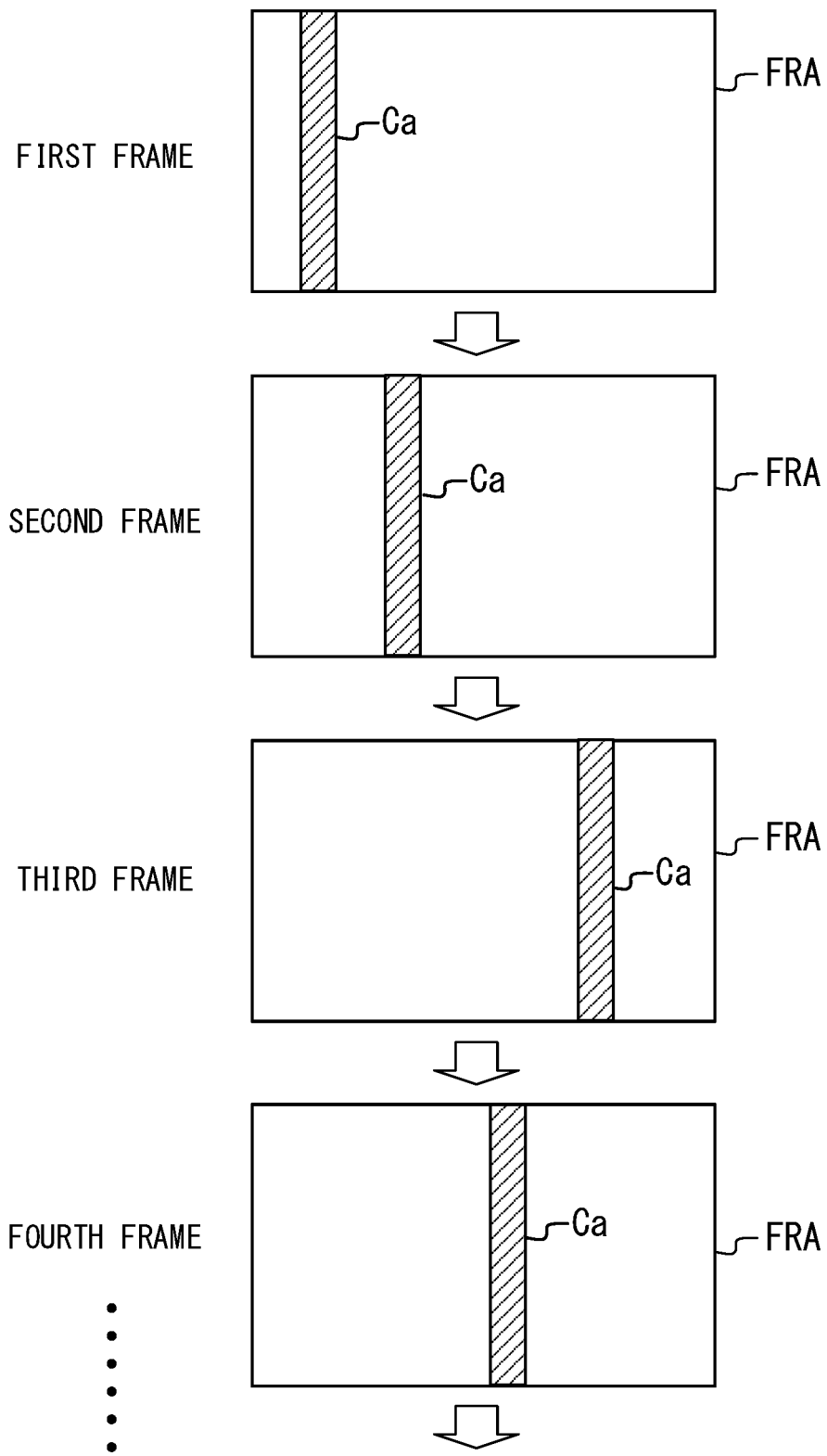
FIG. 3 is a drawing illustrating another example of the inspection image region Ca and another example of the moving configuration of the inspection image region Ca that changes the coordinate position in one-frame image FRA for each frame.

FIG. 3 is a drawing illustrating another example of the inspection image region Ca and another example of the moving configuration of the inspection image region Ca that changes the coordinate position in the one-frame image FRA for each frame.

The inspection image region Ca illustrated in FIG. 3 is a strip-shaped region extending in a perpendicular direction across an upper end and a lower end of the one-frame image FRA. Accordingly, to employ the inspection image region Ca with the configuration illustrated in FIG. 3, the inspection region defining circuit 20 supplies the inspection image region designation signal JA to horizontally move the coordinate position of the inspection image region Ca to the second distortion correction circuit 13 and the inspection region extraction circuit 21 for each frame.

The first distortion correction circuit 12 and the second distortion correction circuit 13 read correction data from the distortion correction data memory 14. The distortion correction data memory 14 preliminarily stores data indicative of a direction and an amount of movement of moving the coordinate position of each pixel so as to correct distortion occurred in the projection image projected to the windshield of the vehicle as the above-described distortion correction data.

The first distortion correction circuit 12 performs a mapping process that moves each pixel on the input image signal VS based on this distortion correction data to generate a distortion-corrected image signal CV on which the distortion correction has been performed and supplies it to the image irradiation unit 15 and the inspection region extraction circuit 21.

The image irradiation unit 15 irradiates a display light to project the image indicated by the distortion-corrected image signal CV to the windshield of the vehicle or the like. The image irradiation unit 15 may include an optical system that optically corrects distortion when this image is projected.

The inspection region extraction circuit 21 extracts an image signal in charge of the display of the inspection image region Ca at the coordinate position in the one-frame image indicated by the inspection image region designation signal JA from the distortion-corrected image signal CV and supplies it to the failure determination circuit 22 as an inspection image signal CH1.

The second distortion correction circuit 13 receives the above-described inspection image region designation signal JA and extracts the image signal in charge of the display of the inspection image region Ca at the coordinate position in the one-frame image indicated by the inspection image region designation signal JA from the input image signal VS as an extracted image signal. The second distortion correction circuit 13 performs the mapping process that moves each pixel on the extracted image signal based on the distortion correction data read from the distortion correction data memory 14 and generates the inspection image signal on which the distortion correction has been performed. The second distortion correction circuit 13 supplies the generated inspection image signal to the failure determination circuit 22 as an inspection image signal CH2.

The failure determination circuit 22 obtains a percentage of match of both pixels of the respective inspection image signals CH1 and CH2 being matched. When this percentage of match is less than a predetermined threshold, the failure determination circuit 22 determines that the inspection image signal CH1 and CH2 are mutually different, and generates a signal representing the failure as the above-described failure detection signal BC. The failure determination circuit 22 supplies the failure detection signal BC to the controller 11 and the notification circuit 24.

In the failure determination using the threshold as described above, the failure determination circuit 22 is configured so as not to determine a failure at a level not affecting visual confirmation of a driver, for example, a bit defect, as a failure.

In response to the failure detection signal BC, the notification circuit 24 notifies a user (for example, the driver of the vehicle, the fellow passenger, or the like) of the failure by voice, display, or flash or lighting of a light-emitting device, such as an LED, or the like.

An internal operation of the HUD device 100 will be described below following the timing chart illustrated in FIG. 4.

The second distortion correction circuit 13 is assumed to include a first memory that holds an image signal corresponding to an odd-numbered frame, a second memory that holds an image signal corresponding to an even-numbered frame in the input image signal VS, and a buffer.

Figure 4:
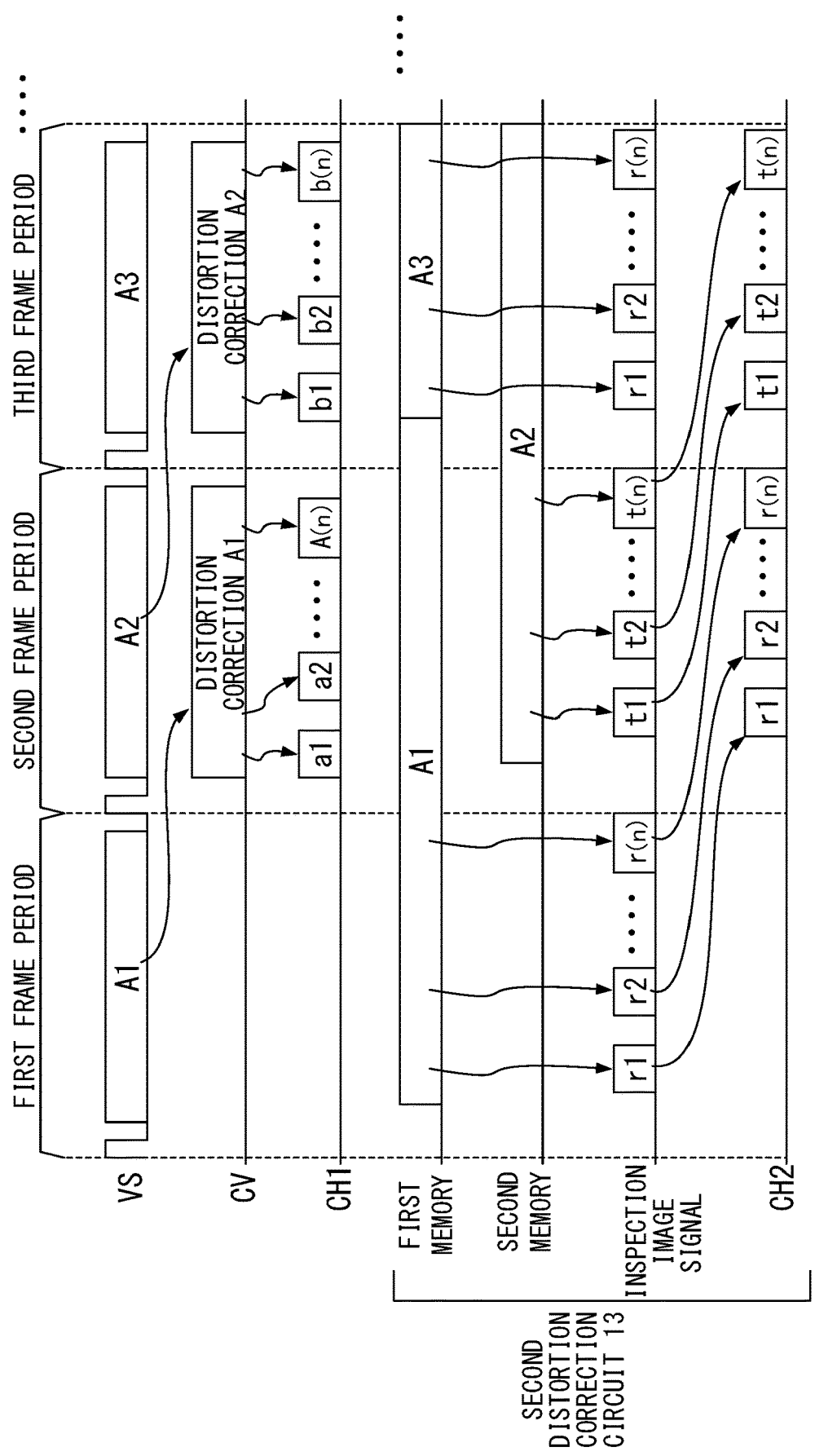
FIG. 4 is a timing chart representing an internal operation of the head-up display device 100.

As illustrated in FIG. 4, the input image signals VS each representing an image A1 in a first frame, an image A2 in a second frame, and an image A3 in a third frame are supplied to the first distortion correction circuit 12 and the second distortion correction circuit 13 in order.

As illustrated in FIG. 4, the first distortion correction circuit 12 outputs the distortion-corrected image signal CV obtained by performing the mapping process on the input image signal VS corresponding to the image A1 at the timing of the second frame. As illustrated in FIG. 4, the first distortion correction circuit 12 continuously outputs the distortion-corrected image signal CV obtained by performing the mapping process on the input image signal VS corresponding to the image A2 at the timing of the third frame.

As illustrated in FIG. 4, in the second frame, the inspection region extraction circuit 21 outputs inspection image signals a1 to a(n) (n is an integer of 2 or more) in order as the inspection image signals CH1 corresponding to the inspection image region Ca defined in the first frame. That is, the inspection region extraction circuit 21 divides the inspection image signal in charge of the display of the inspection image region Ca into the inspection image signals a1 to a(n) and outputs them. As illustrated in FIG. 4, in the third frame, the inspection region extraction circuit 21 outputs inspection image signals b1 to b(n) in order as the inspection image signals CH1 corresponding to the inspection image region Ca defined in the second frame.

During this period, as illustrated in FIG. 4, the first memory in the second distortion correction circuit 13 holds the input image signal VS corresponding to the image A1 in the first frame period in order for each display line, and each of them is held over the second frame period. As illustrated in FIG. 4, in the third frame period, this first memory holds the input image signal VS corresponding to the image A3 in order for each display line. Additionally, as illustrated in FIG. 4, the second memory in the second distortion correction circuit 13 holds the input image signal VS corresponding to the image A2 in the second frame period in order for each display line, and each of them is held over the third frame period.

In the first frame period, the second distortion correction circuit 13 extracts, for example, the image signals corresponding to the inspection image region Ca in the first frame in FIG. 3 in order from the image signals corresponding to the image A1 held in the first memory. Next, the second distortion correction circuit 13 performs the mapping process on the respective image signals corresponding to the inspection image region Ca. Accordingly, as illustrated in FIG. 4, the second distortion correction circuit 13 generates inspection image signals r1 to r(n) corresponding to this inspection image region Ca in order over the first frame period and causes the buffer to hold them.

In the second frame period, the second distortion correction circuit 13 extracts, for example, the image signals corresponding to the inspection image region Ca in the first frame in FIG. 3 in order from the image signals corresponding to the image A2 held in the second memory. The second distortion correction circuit 13 performs the mapping process on the respective image signals corresponding to the inspection image region Ca. Accordingly, as illustrated in FIG. 4, the second distortion correction circuit 13 generates inspection image signals t1 to t(n) corresponding to this inspection image region Ca in order over the second frame period and causes the buffer to hold them.

Further, as illustrated in FIG. 4, in this second frame period, the second distortion correction circuit 13 supplies the inspection image signals r1 to r(n) held in the buffer as the inspection image signals CH2 to the failure determination circuit 22 in order. Accordingly, the failure determination circuit 22 compares a1 to a(n) as the inspection image signals CH1 with r1 to r(n) as the inspection image signals CH2 over the second frame period. That is, first, the failure determination circuit 22 determines whether the pixels are matched in the inspection image signals a1 and r1, generates the failure detection signal BC only when the percentage of match between the respective pixels is less than a predetermined value, and supplies it to the controller 11 and the notification circuit 24. Next, the failure determination circuit 22 determines whether the pixels are matched in the inspection image signals a2 and r2, generates the failure detection signal BC only when the percentage of match between the respective pixels is less than the predetermined value, and supplies it to the controller 11 and the notification circuit 24. Similarly, the failure determination circuit 22 compares the pixels in the respective inspection image signals a3 to a(n) and the respective inspection image signals r3 to r(n), generates the failure detection signal BC only when the percentage of match between the respective pixels is less than the predetermined value, and supplies it to the controller 11 and the notification circuit 24.

As illustrated in FIG. 4, in the third frame period, the second distortion correction circuit 13 supplies the inspection image signals t1 to t(n) held in the buffer as the inspection image signals CH2 to the failure determination circuit 22 in order. Accordingly, the failure determination circuit 22 compares b1 to b(n) as the inspection image signals CH1 with t1 to t(n) as the inspection image signals CH2 similarly to the above-described operation in the second frame period over the third frame period.

As described in detail above, when the outputs results (CH1, CH2) of the first distortion correction circuit 12 and the second distortion correction circuit 13 are used as the inspection target for failure detection, the HUD device 100 uses the part corresponding to the inspection image region Ca having the smaller size than the one-frame image as the inspection target.

Accordingly, as the second distortion correction circuit 13 disposed for failure detection, compared with one that performs a mapping process on an image signal by one frame, a circuit scale and an amount of power consumption can be decreased.

Note that the HUD device 100 needs not to include the controller 11, the image irradiation unit 15, or the notification circuit 24.

In short, the HUD device 100 only needs to include the following first and second distortion correction circuits, inspection region defining circuit, inspection region extraction circuit, and failure determination circuit as the image distortion correction circuits.

That is, the first distortion correction circuit (12) performs the mapping process on the input image signal (VS) and generates the distortion-corrected image signal (CV). The mapping process corrects distortion occurred in the one-frame image represented by the input image signal. The inspection region defining circuit (20) defines the image region having the smaller size than the one-frame image as the inspection image region (Ca) for failure inspection. The inspection region extraction circuit (21) extracts the part in charge of the display of the inspection image region from the distortion-corrected image signal (CV) and outputs the part as the first inspection image signal (CH1). The second distortion correction circuit (13) outputs the part in charge of the display of the inspection image region in the input image signal on which the mapping process has been performed as the second inspection image signal (CH2). The failure determination circuit (22) determines that a failure occurs when the first inspection image signal and the second inspection image signal are mutually different, and outputs the failure detection signal (BC).

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. This application is based upon and claims the benefit of priority from the prior Japanese Patent Application No. 2020-062224 filed on Mar. 31, 2020, the entire contents of which are incorporated herein by reference.

What is claimed is:

1. An image distortion correction circuit comprising:
   a first distortion correction circuit that performs a mapping process on an input image signal to generate a distortion-corrected image signal, a distortion occurred in a one-frame image represented by the input image signal being corrected in the mapping process;
   an inspection region defining circuit that defines an inspection image region in the one-frame image for failure inspection, the inspection image region being a part of a whole region of the one-frame image;
   an inspection region extraction circuit that extracts a part corresponding to the inspection image region from the distortion-corrected image signal and outputs the part of the distortion-corrected image signal as a first inspection image signal;
   a second distortion correction circuit that outputs a second inspection image signal, the second inspection image signal being generated by performing the mapping process on the part of the input image signal corresponding to the inspection image region; and
   a failure determination circuit that determines that a failure occurs and outputs a failure detection signal when the first inspection image signal and the second inspection image signal are mutually different, wherein
   the inspection region defining circuit changes a coordinate position of the inspection image region in the one-frame image for each frame in the input image signal.

2. The image distortion correction circuit according to claim 1, wherein
   the failure determination circuit determines whether respective pixels of the first inspection image signal and the second inspection image signal are matched, and when a percentage of match of the pixels is less than a predetermined threshold, the failure determination circuit determines that the first inspection image signal and the second inspection image signal are mutually different.

3. A display device comprising:
   a first distortion correction circuit that performs a mapping process on an input image signal to generate a distortion-corrected image signal, a distortion occurred in a one-frame image represented by the input image signal being corrected in the mapping process;
   an image irradiation unit that irradiates a display light to project an image indicated by the distortion-corrected image signal;
   an inspection region defining circuit that defines an inspection image region in the one-frame image for failure inspection, the inspection image region being a part of a whole region of the one-frame image;
   an inspection region extraction circuit that extracts a part corresponding to the inspection image region from the distortion-corrected image signal and outputs the part of the distortion-corrected image signal as a first inspection image signal;
   a second distortion correction circuit that outputs a second inspection image signal, the second inspection image signal being generated by performing the mapping process on the part of the input image signal corresponding to the inspection image region in the input image signal; and
   a failure determination circuit that determines that a failure occurs and outputs a failure detection signal when the first inspection image signal and the second inspection image signal are mutually different, wherein
   the inspection region defining circuit changes a coordinate position of the inspection image region in the one-frame image for each frame in the input image signal.

4. The display device according to claim 3, comprising:
   a controller that generates an image signal representing various kinds of information with a character or a drawing as the input image signal; and
   a notification circuit that notifies a user of a failure in response to the failure detection signal, wherein
   the controller generates an image signal with enhanced transparency of the character or the drawing as the input image signal in response to the failure detection signal.

* * * * *